United States Patent [19]

Aschwanden et al.

[11] 4,128,093

[45] Dec. 5, 1978

[54] DRESSING DEVICES FOR PROFILING GRINDING WHEELS FOR THE FORM GRINDING OF INVOLUTE GEARS

[75] Inventors: Paul F. Aschwanden; Milan Bartosek, both of Zürich, Switzerland

[73] Assignee: Maag Gear-Wheel & Machine Co. Ltd., Zürich, Switzerland

[21] Appl. No.: 714,965

[22] Filed: Aug. 16, 1976

[30] Foreign Application Priority Data

Aug. 19, 1975 [DE] Fed. Rep. of Germany ....... 2536895

[51] Int. Cl.² .............................................. B24B 53/08
[52] U.S. Cl. .............................. 125/11 T; 125/11 CC
[58] Field of Search ................ 125/11 R, 11 CC, 11 T

[56] References Cited

U.S. PATENT DOCUMENTS

| 2,975,781 | 3/1961 | Looman | 125/11 T |
| 3,830,215 | 8/1974 | Bartosek | 125/11 T |

OTHER PUBLICATIONS

Abrichtgerate fur das Profilschleifen von Schragstirnradern by Niemann et al., dated 1960.

*Primary Examiner*—Harold D. Whitehead
*Attorney, Agent, or Firm*—Toren, McGeady and Stanger

[57] ABSTRACT

A device for dressing a grinding wheel for form grinding of helically toothed involute cylindrical gears comprises a straight edge rolling on an arcuate guide, and a guideway adjustable to the base helix angle of the gear being ground is given an involute movement by the straight edge and guides a tool-holder slide carrying a pointed dressing tool. A pivot member participates in the pivoting component of the straight edge movement, and for modifying the dressing tool path by moving the slide along said guideway there is a crank gear comprising a first crank slide rectilinearly displaceable by the pivoting of said pivot member, a crank on a fixed pivot and connected to said first crank slide and a second crank slide guided parallel to said first slide and driving the tool-holder slide.

8 Claims, 4 Drawing Figures

DRESSING DEVICES FOR PROFILING GRINDING WHEELS FOR THE FORM GRINDING OF INVOLUTE GEARS

BACKGROUND OF THE INVENTION

The invention relates to a dressing device for profiling grinding wheels for the form grinding of helically toothed involute cylindrical gears, of the kind that comprises an arcuate roller guide, a rolling straight edge, which is capable of rolling on the roller guide, a tool-holder slide guideway, which is helically adjustable to correspond to the base helix angle of the toothing to be ground and can have an involute movement imparted to it from the said straight edge, a tool-holder slide, which is displaceable along the tool holder slide guideway and carries a pointed or tipped dressing tool, and a pivotable member which, with the rolling movement of the rolling straight edge, participates in its pivotal movement about the axis of the roller guide but not in its rectilinear rolling movement component.

With one known dressing device of this type (German Patent Specification No. 1,050,152), the pivotable member is T-shaped in form and comprises a longitudinal beam and a transverse beam. Mounted on the transverse beam are rollers which run on the rolling straight edge in its longitudinal direction, so that the transverse beam always extends parallel to the straight edge and the longitudinal beam always extends perpendicular to the straight edge. The longitudinal beam has a guideway which extends along it, that is to say, at right-angles to the straight edge, and which accommodates a bearing block which is adjustable by means of a screw along the guideway. A crank gear, which converts the pivoting movements of the pivotal member into displacements of the tool-holder slide is a crank-grinding gear with a crank, a rocker arm and a lifting rod. The crank is mounted on the bearing block so as to be incapable of displacement relative thereto and is so connected by a parallel guide linkage to a fixed structural part of the dressing device that it is only capable of being moved parallel to itself. The rocker arm is guided so as to be displaceable longitudinally on two slider blocks, one of which is rotatably mounted on one end of the crank and the other of which is rotatably mounted on the bearing block. An end of the rocker arm remote from the bearing block is pivotally connected to the lifting rod, which is guided for displacement on the straight edge parallel to its longitudinal direction and which carries a pin extending at right-angles to the plane of the straight edge. The tool holder slide is directly guided on the straight edge and comprises a transverse arm on which the pin of the lifting rod bears for displacing the tool holder slide.

This known dressing device is susceptible to errors because of the many moving parts of the crank grinding unit (see article by G. Niemann and J. Looman "Abrichtgeräte für das Profilschleifen von Schrägstirnrädern" VDI Journal 102 (1960), No. 6, 21st February, pages 231-238). The error susceptibility of this known crank grinding gear is mainly due to the fact that the angle between the crank and the rocker arm is considerably altered with the rolling movement and the swinging of the pivotal member that is associated therewith, so that there is a danger of jamming occurring. Furthermore, the crank grinding gear is difficult to fit, because the longitudinal beam of the pivotal plate is necessarily comparatively long. Moreover, this known dressing device can only be used with a specific rolling cylinder; it cannot be so modified that the diameter of the base circle is continuously adjustable.

Accordingly, the invention has for its object to design a dressing device of the type initially described and having a simple and robust crank gear, which is capable of guiding the tip of the dressing tool on a curve which corresponds with sufficient accuracy to the common line of contact between one tooth flank of an involute cylindrical gear and a grinding wheel which is grinding the said tooth flank.

SUMMARY OF THE INVENTION

According to the invention in one of its aspects, a wheel dressing device is provided with a crank gear which comprises a first crank slide which can be moved forwards and backwards according to the pivotal movements of the pivotal member, a crank which is mounted on a fixed pivot and is connected to the first crank slide by a first slider, and also a second crank slide which is guided parallel to the first crank slide and is connected to the crank by a second slider and in its turn drives the tool-holder slide.

The two crank slides are always capable of easy displacement in their guideways which are parallel to one another and the transmission of movement by the crank does not present any difficulties, since it is readily capable of being so arranged that, in each rolling position of the rolling straight edge, and hence also in each pivoted position of the pivotal member, it encloses with each of the two crank slides an angle which does not differ too much from 90°. The crank gear can readily be arranged outside the mechanism generating the involute, so that a continuous adjustability of the base circle diameter can for example be provided in known manner.

With one preferred constructional form of the invention, the pivot on which the crank is mounted is disposed coaxially with the arcuate roller guide: by way of example, the pivot may be formed as a spigot on a main shaft carrying the pivotal member.

The first slider can be mounted to be rotatable on the first crank slide and be guided in a longitudinal guideway formed on the crank. With this arrangement, the path of movement of the tip of the dressing tool does of course differ somewhat from the theoretically correct path of movement along the line of contact between the helical involute tooth flank which is to be ground and the grinding wheel; however, this deviation can be disregarded in practical use.

An even better approximation to the theoretically correct path of movement is provided when the first slider is rotatably mounted on the crank and is guided in a transverse guideway formed on the first crank slide.

With both the arrangements of the first slider which have been described, it is expedient for the second slider to be guided for longitudinal displacement on the crank and for it to be rotatably mounted on an adjusting element, which is adjustably fixed on the second crank slide transversely of its direction of movement.

The two crank slides are advantageously guided on fixed guideways. The accuracy in operation of the dressing device according to the invention is further improved by this fixed arrangement of the guideways.

In a preferred arrangement, the first crank slide comprises a rack with which meshes a gear which is fixed on the pivot plate.

According to another aspect of the invention there is provided a method of dressing profiled grinding wheels for the form grinding of helically toothed involute cylindrical gears, in which the dressing tool is operative on the grinding wheel in a single movement which is a combination of an involute-like motion with a motion in the direction of the base helix angle of the toothing to be ground, comprising moving the dressing tool in the direction of the base helix angle in an at least approximate linear function of the rolling angle for the involute form in accordance with the formula $$e = r_b \cdot \sin\beta_b \, (A/r_b - 1) \cdot \frac{\psi}{2} + r_b \cdot \sin\beta_b \cdot \eta_b \qquad (2)$$

wherein the symbols have the meanings set out at the end of this specification.

According to further aspect of the invention there is provided a method of dressing profiled grinding wheels for the form grinding of helically toothed involute cylindrical gears, in which the dressing tool acts on the grinding wheel in a single movement, which is a combination of an involute-like motion with a movement in the direction of the base helix angle of the toothing to be ground comprising moving the dressing tool in the direction of the base helix angle in at least an approximately linear function of the rolling angle for the involute form in accordance with the formula $$e = r_b \cdot \sin\beta_b \, (A/r_b - 1) \frac{\psi}{2\sqrt{1 - (\psi \cdot r_{25}/B')^2}} + r_b \cdot \sin\beta_b \cdot \eta_b \qquad (4)$$

wherein the symbols have the meanings set out at the end of this specification.

BRIEF DESCRIPTION OF THE DRAWINGS

The invention will now be more particularly described by way of example with reference to the accompanying diagrammatic drawings, in which.

DESCRIPTION OF THE PREFERRED EMBODIMENTS

Figure 1:
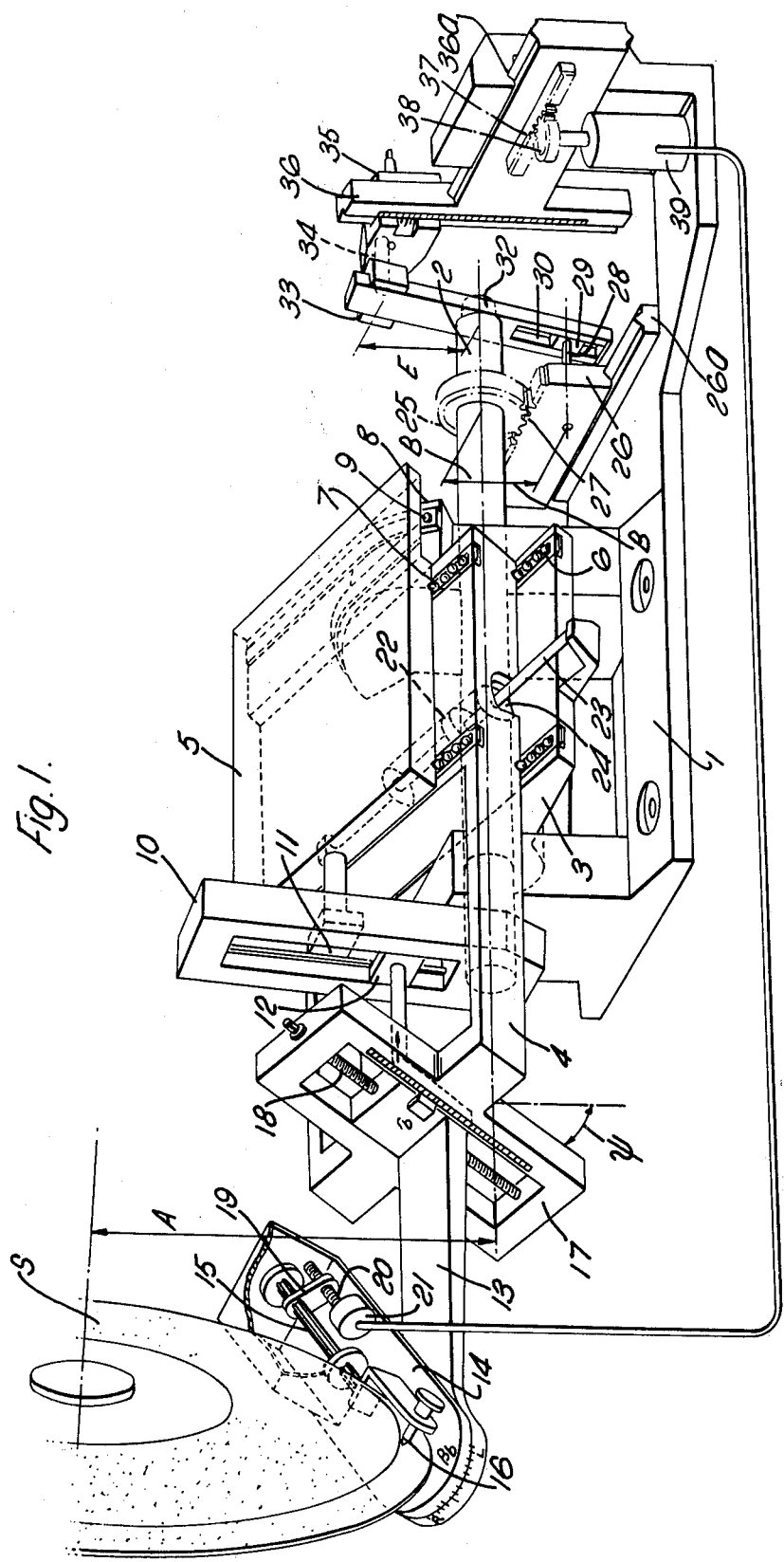
FIG. 1 shows a dressing device according to the invention in a perspective view.

The dressing device which is shown in FIG. 1 for dressing a grinding wheel S, comprises a bed 1 which is to be fixed on a tooth flank grinding machine of conventional design and which is not illustrated. A main shaft 2 has a two-bearing mounting on the bed 1 and fixed on the main shaft between the two bearings is a pivot plate 3. Guided for displacement transversely of the main shaft 2 on the pivot plate 3 is an intermediate slide 4, and a rolling straight edge 5 is arranged on said slide. Between the pivot plate 3 and the intermediate slide 4 guides 6 are provided and, arranged parallel thereto and between the intermediate slide 4 and the straight edge 5, are guides 7.

Fixed on the bed coaxially with the main shaft 2 is an arcuate roller block 8, which is connected by two tension tapes 9 to the straight edge 5; in known manner each of the two tapes 9 is fixed at one end to one end of the roller block 8 and at its other end to one end of the straight edge 5.

Mounted for pivotal movement on the main shaft 2 is an arm 10, in which two slider blocks 11 and 12 are guided so that they are displaceable radially of the main shaft. The slider block 11 is rotatably mounted on the straight edge 5, its rotational axis lying in the plane in which the straight edge 5 is rolled on the arcuate roller block 8. The slider block 12 is rotatably mounted on a cross slide 13 on which a tool-holder slide guideway 14 is mounted in a pivotally adjustable manner. A tool-holder slide 15 is guided for displacement on the slide guideway 14 which is so adjusted pivotally in relation to the cross-slide 13 that the direction of displacement of the tool slide 15 is in the plane of the grinding wheel S. The angle between the direction of displacement of the tool slide 15 and the longitudinal direction of the main shaft 2 accordingly conforms to the base helix angle $\beta_b$ of the toothing which is to be ground. The tool slide 15 carries a tipped or pointed dressing tool 16 in the form of a diamond, the tip of which is arranged on the axis of rotation of the slider block 12.

The cross slide 13 is guided for displacement in a slot, directed radially to the main shaft 2, in an end plate 17 fixed on the intermediate slide 4. Said displacement is affected by means of an adjusting spindle 18 extending longitudinally of the slot. By this means it is possible for the tip of the dressing tool 16 to be adjusted corresponding to the base circle radius $r_b$ of the toothing which is to be ground.

On the tool-holder slide 15 there is fixed a plate 19 which has a screwed engagement with a threaded spindle 20 that is mounted so as to be incapable of axial displacement on the tool holder slide guideway 14. A servo-motor 21 is provided on the guideway for rotating the threaded spindle 20 and hence for displacing the tool holder slide 15 along the tool-holder slide guideway 14.

A double-acting piston 22 is provided as drive means for the dressing device, having a piston rod 23 fixed to the pivot plate 3 and a cylinder 24 fixed to the intermediate slide 4. As a result of a pressure medium, such as oil under pressure, being introduced at one or the other end of the piston 22, the intermediate slide 4 is displaced relative to the pivot plate 3 and as a result can generate a rolling motion with which the tip of the dressing tool 16 describes an involute.

An involute-form motion of the dressing tool 16 in relation to the grinding wheel S, without additional longitudinal displacement, is sufficient for the dressing of the grinding wheel when the said wheel is to grind straight toothing for cylindrical gears. In order to grind a helical toothing which has a flank profile which is of involute form in transverse section, it is necessary with the dressing of the grinding wheel for the dressing tool 16 to carry out a rectilinear movement longitudinally of the tool-holder slide guideway 14 in addition to the movement of involute form. In the construction shown in FIG. 1, the following parts of the arrangement are provided for this longitudinal movement:

Fixed on the main shaft 2 is a gear 25, which meshes with a rack 27 formed on a first crank slide 26 slidable on a fixed guideway 26a. Projecting from the first crank slide 26 parallel to the main shaft 2 is a pin 28, and a first slider block 29 rotatably mounted on the pin 28 is guided in a longitudinal guideway 30 of a crank 31. The crank 31 is mounted on a fixed pivot 32, which is arranged coaxially with the main shaft 2 and, in the example as illustrated, is actually formed on the shaft.

Guided on the crank 31 to be slidable in the longitudinal direction thereof, i.e. radially in relation to the pivot 32, is a second slider block 33, which has a pivot pin 34 on an adjusting element 35 that is fixed on a second crank slide 36 mounted on a fixed guideway 36a. The two crank slides 26 and 36 are guided for displacement parallel to one another and at right-angles to the main shaft 2 on the bed 1. The element 35 is adjustable on the second crank slide 32 transversely of the direction of displacement of the slide.

The second crank slide 36 carries a rack 37, which meshes with a pinion 38 of a signal transmitter 39. The signal transmitter 39 is so connected with the servomotor 21 through a hydraulic, electrical or mechanical connection 40 that rotation of the pinion 38 produces an equal or proportional rotation of the threaded spindle 20.

When the intermediate slide 4 is displaced relative to the pivot plate 3 along the guideways 6, then the end plate 17, and with it the cross slide 13, participate in the displacement. Consequently, the slider block 12 which is mounted on the cross slide 13 rotates the arm 10 and the latter, through the slider block 11, carries the straight edge 5 with it. The straight edge 5 is therefore rolled on the fixed arcuate roller block 8 and as a consequence executes a pivotal movement about the main shaft 2 jointly with the intermediate slide 4 and the pivot plate 3. The result is that an accurate involute movement of the dressing tool 16 is established, if the adjusting element 35 assumes a zero position in which the axis of the pivot shaft 34 corresponds to the axis of the pivot 32. This zero position of the adjusting element 35 makes possible the already mentioned dressing of the grinding wheel S for grinding straight toothing of involute form (helix angle = 0°).

The involute described by the tip of the dressing tool 16 with each swivelling movement of the pivot plate 3 is directly related to the radius of the arcuate roller block 8 if the cross slide 13 is so adjusted by means of the adjusting spindle 18 that the tip of the dressing tool 16 lies in the plane in which the straight edge 5 rolls on the arcuate roller block 8. However, as shown in FIG. 1, with a radial spacing between the two slider blocks 11 and 12 which are guided on the arm 10, the tip of the dressing tool 16 describes another involute which corresponds to a smaller base circle radius $r_b$. Should the cross slide 13 be so adjusted that the tip of the dressing tool 16 lies radially outside the path of rotation of the slider block 11 relative to the main shaft 2, then the involute described by the tip of the dressing tool would correspond to a base circle, the radius $r_b$ of which is larger than that of the roller block 8.

If now the grinding wheel S is to be dressed for grinding helical teeth, in which the transverse profile (profile in transverse section) is of involute form, but not the normal profile (profile normal to the tooth trace) which is decisive as regards the form of the grinding wheel, then the tool holder slide guideway 14 is adjusted to the corresponding base helix angle $\beta_b$ and the adjusting element 35 is offset from the pivot 32 to a distance of value E, which is given by the formula (1) indicated at the end of this description.

With the rolling motion, the main shaft 2 is rotated correspondingly with the swivelling movement of the pivot plate so that the first crank slide 26 is displaced by the gear 25, and with it the first slider block 29. As a result of the offsetting of the element 35 from the pivot 32, because of this displacement the crank 31 is pivoted and consequently the second slider block 33 imparts to the second crank slide 36 a displacement, the amount of which depends on the amount E by which the adjusting element 35 has been offset. This displacement is transmitted by the rack 37 and gear 38 to the signal transmitter 39 and from thence with a transmission ratio Q, to the servomotor 21 and thus to the tool holder slide 15 with the dressing tool 16. The longitudinal displacement $e$ so produced of the dressing tool 16 will be proportional to the pivoted angle $\psi$ of the pivot plate 3 and is given by the formula (2) indicated at the end of this description. Through the combination of the longitudinal displacement and the involute motion of the dressing tool 16, the grinding wheel S is dressed in one stroke.

Figure 2:
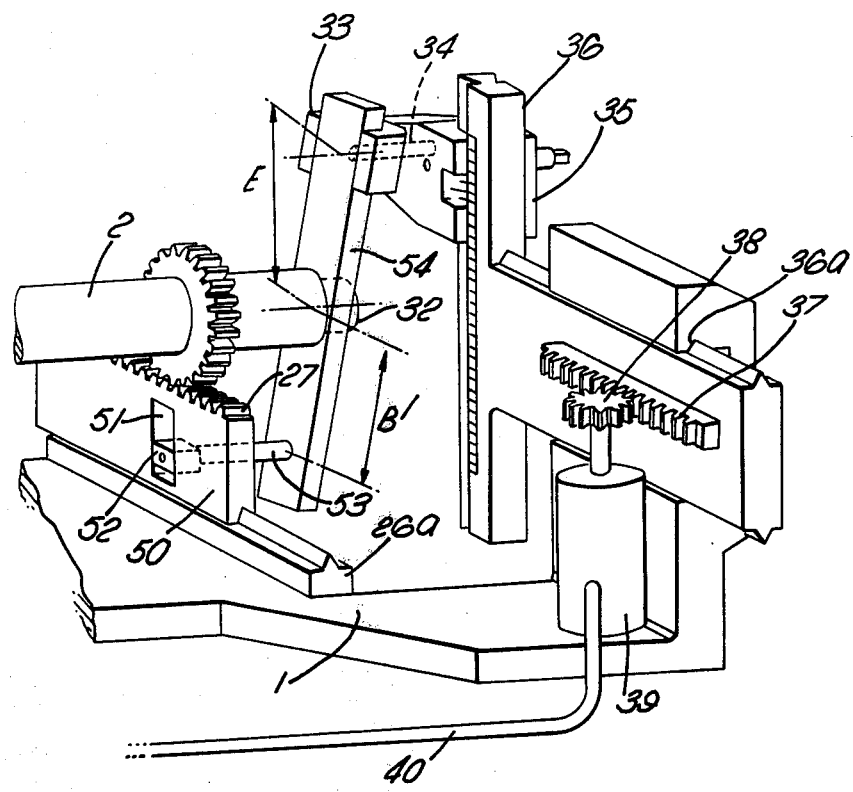
FIG. 2 shows modification of a part of the device in FIG. 1.

In the modified construction shown in FIG. 2, the rack 27 which is in mesh with the gear 25 is arranged on a first crank slide 50 which comprises a guideway 51 extending transversely to the direction of movement of the slide. Guided in the transverse guideway 51 is a first slider block 52 mounted on a pin 53 on a crank 54. In other respects, the crank 54 does not differ from the crank 31 which is shown in FIG. 1. The crank 54 is thus mounted on a fixed pivot 32 arranged coaxially with the main shaft 2 and which is actually formed on the said shaft. As with the crank 31 in FIG. 1, the second slider block 33 is guided on the crank 54, the pivot pin 34 of said block being arranged on the adjusting element 35. In this case, the adjusting element 35 is set at a value E given by formula (3) as indicated below. The displacement $e$ of the tool holder slide 15 and thus of the dressing tool 16 relatively to the tool holder slide guideway 14 is obtained from the formula (4) given below. Formula (4) shows that the dependence of the displacement $e$ on the rolling or generating angle $\psi$ is no longer linear; the displacement corresponding to formula (4) is a particularly good approximation to the theoretically correct displacement, but also the displacement $e$, which is provided according to formula (2) with the constructional form in accordance with FIG. 1, satisfies practical requirements.

Figure 3:
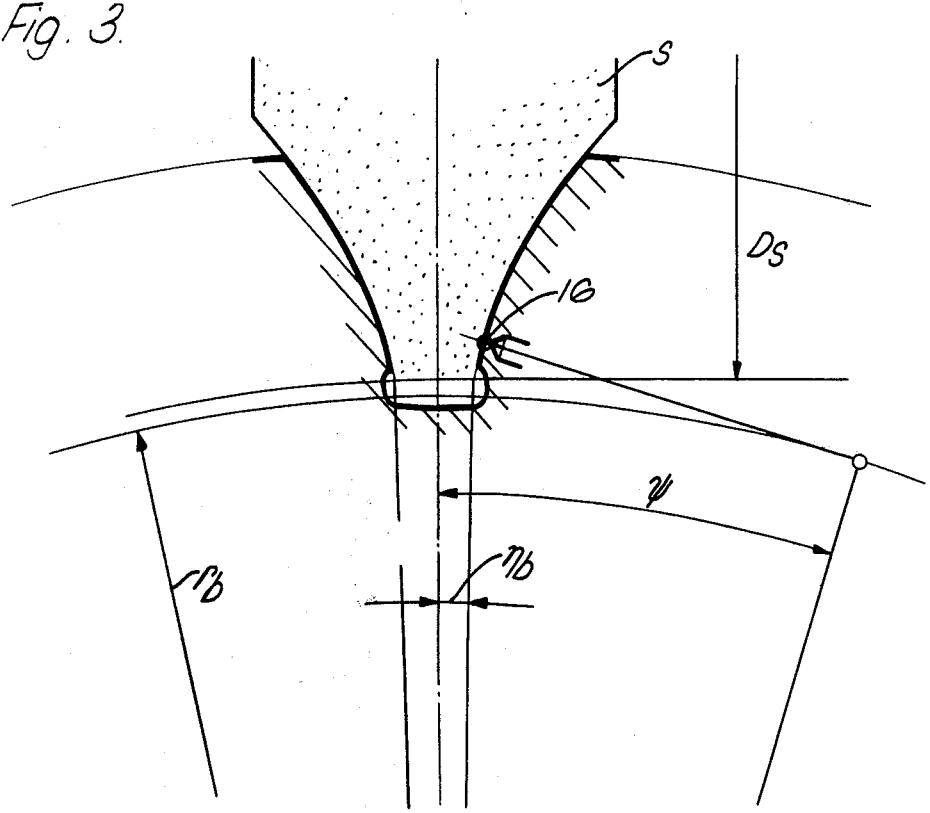
FIG. 3 is an end section of a helical involute toothing (only partially drawn) and of a grinding disc during the form grinding of the toothing.
Figure 4:
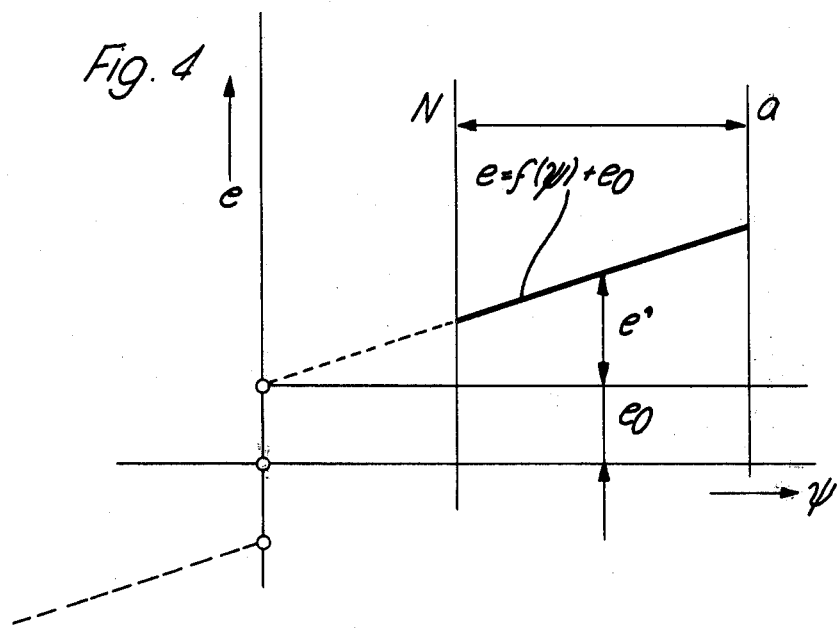
FIG. 4 is a diagram in which is represented the travel of a dressing tool over the rolling angle.

The quantities which appear in the drawings, more particularly in FIGS. 3 and 4 and in the following formulae, have the following meanings:

A = distance of the axis of the grinding wheel from the main shaft 2, which corresponds to the axis of the gear wheel which is to be ground B = shortest distance of the pivot axis of the slider block 29 (FIG. 1) from the main shaft 2

B' = distance of the pivot axis of the slider block 52 (FIG. 2) from the main shaft 2

$D_s$ = diameter of the grinding wheel S

E = Adjustable spacing of the pivot axis of the slider block 33 (FIGS. 1 and 2) from the main shaft 2

Q = transmission ratio of signal transmitter 39 to servomotor 20

$e = e' + e_o$ = total displacement of the dressing tool 16 along the tool holder slide guideway 14

$e_o$ = constant basic amount of the displacement e, dependent on the spacewidth angle of the toothing to be ground N = end of utilizable range of involute a = end of addendum $e'$ = that part of the displacement e which is dependent upon the rolling motion and the toothing data $r_b$ = base circle radius of the toothing to be ground $r_{25}$ = reference or pitch circle radius of the gear 25
$\beta_b$ = base helix angle of the toothing to be ground
$\psi$ = rolling angle
$\eta_b$ = spacewidth half angle on the base circle.

The following relationships exist between these values:

CONSTRUCTION ACCORDING TO FIG. 1

$$E = \frac{r_b \cdot \sin\beta_b (A/r_b - 1)}{2 \cdot Q \cdot r_{25}/B} ; \quad (1)$$

$$e = r_b \cdot \sin\beta_b (A/r_b - 1) \cdot \frac{\psi}{2} + r_b \cdot \sin\beta_b \cdot \eta_b; \quad (2)$$

CONSTRUCTION ACCORDING TO FIG. 2

$$E = \frac{r_b \cdot \sin\beta_b (A/r_b - 1)}{2 \cdot Q \cdot r_{25}/B'} ; \quad (3)$$

$$e = r_b \cdot \sin\beta_b (A/r_b - 1) \frac{\psi}{2\sqrt{1 - (\psi \cdot r_{25}/B')^2}} + \quad (4)$$

$$r_b \cdot \sin\beta_b - \eta_b$$

We claim:

1. Dressing device for profiling grinding wheels for the form grinding of helically toothed involute cylindrical gears, the device comprising an arcuate roller guide, a rolling straight edge, means connecting said straight edge to the roller guide for restraining the straight edge to roll on the roller guide, a tool-holder slide guideway, mounting means for said guideway permitting angular adjustment of the guideway thereon according to the base helix angle of the toothing to be ground, means connecting said mounting means to the straight edge for imparting an involute motion thereto from the movements of said straight edge, a tool-holder slide, displaceable along the tool holder slide guideway and carrying a tipped or pointed dressing tool, a pivot member constrained to be displaced with said rolling of the straight edge so as to participate in the pivotal movement of the straight edge about the axis of the roller guide but not in its rectilinear rolling movement component, a first crank slide, means locating said first slide for reciprocating movement and means for causing said first slide movements in dependence upon the pivotal movements of the pivot member, a crank, a fixed pivot mounting for said crank and a first slider connecting the crank to said first crank slide for movement of the crank by said first crank slide, a second crank slide, means guiding said second slide for movement parallel to the first crank slide and a second slider connecting the crank to said second crank slide for movement of said second slide by the crank, means connecting said second crank slide to the tool-holder slide for said displacement of the tool-holder slide along its guideway in dependence upon the movement of said second slide, the arrangement being such that said displacement of the tool-holder slide modifies said involute motion for profiling a grinding wheel for the form grinding of a helically toothed involute cylindrical gear.

2. Dressing device according to claim 1 wherein the pivot on which the crank is mounted is disposed coaxially with the roller guide.

3. Dressing device according to claim 2 comprising a main shaft on which the pivot member is mounted has said crank pivot provided on it.

4. Dressing device according to claim 1 comprising a guideway extending longitudinally on the crank for guidance of the first slider and a rotatable connection being provided between said first slider and the first crank slide.

5. Dressing device according to claim 1 comprising a guideway on the first crank slide extending transversely to the direction of displacement of said first slide, the guideway serving for guidance of the first slider and a rotatable connection being provided between the crank and the first slider.

6. Dressing device according to claim 1 comprising guidance means for displacement of the second slider longitudinally on the crank an adjusting element adjustable on the second crank slide transversely of its direction of movement and securable thereto, and a pivot connection between said second slider and said adjusting element.

7. Dressing device according to claim 1 comprising fixed guideways on which the two cranks slides are guided.

8. Dressing device according to claim 7 wherein said means for causing movements of the first crank slide with the pivot member comprises a rack on the slide and a gear fixed to the pivot member and which meshes with the rack.

* * * * *